United States Patent [19]

Ishihara et al.

[11] Patent Number: 5,761,555
[45] Date of Patent: Jun. 2, 1998

[54] CAMERA HAVING MAGNETIC HEAD

[75] Inventors: Masaaki Ishihara, Yokohama; Fumio Kimura, Kawasaki, both of Japan

[73] Assignee: Canon Kabushiki Kaisha, Tokyo, Japan

[21] Appl. No.: 573,758

[22] Filed: Dec. 18, 1995

Related U.S. Application Data

[63] Continuation of Ser. No. 83,250, Jun. 29, 1993, abandoned.

[30] Foreign Application Priority Data

Jun. 30, 1992 [JP] Japan .................................. 4-194535

[51] Int. Cl.⁶ .................................................. G03B 17/24
[52] U.S. Cl. ........................................ 396/319; 396/320
[58] Field of Search .................................. 354/105, 106, 354/109, 288; 396/310, 311, 312, 319, 320, 535

[56] References Cited

U.S. PATENT DOCUMENTS

| | | | |
|---|---|---|---|
| 4,878,075 | 10/1989 | Cannon | 354/173.1 |
| 4,933,780 | 6/1990 | Wash et al. | 354/106 |
| 4,947,196 | 8/1990 | Wash et al. | 354/106 |
| 4,952,967 | 8/1990 | Kazumi et al. | 354/442 |
| 4,972,213 | 11/1990 | Stoneham et al. | 354/21 |
| 5,005,031 | 4/1991 | Kelbe | 354/106 |
| 5,028,940 | 7/1991 | Pearson | 354/75 |
| 5,097,278 | 3/1992 | Tamamura et al. | 354/105 |
| 5,136,318 | 8/1992 | Aoshima | 354/105 |
| 5,151,726 | 9/1992 | Iwashita et al. | 354/75 |
| 5,155,511 | 10/1992 | Tamamura | 354/76 |
| 5,204,708 | 4/1993 | Whitfield et al. | 354/105 |
| 5,229,810 | 7/1993 | Cloutier et al. | 354/106 |
| 5,321,452 | 6/1994 | Tsujimoto | 354/106 |

FOREIGN PATENT DOCUMENTS

| | | |
|---|---|---|
| 0472364 | 2/1992 | European Pat. Off. |
| 0475447 | 3/1992 | European Pat. Off. |
| 0490540 | 3/1992 | Japan |
| 5119386 | 5/1993 | Japan |

*Primary Examiner*—Safet Metjahic
*Assistant Examiner*—Nicholas J. Tuccillo
*Attorney, Agent, or Firm*—Fitzpatrick, Cella, Harper & Scinto

[57] ABSTRACT

This invention relates to a camera of a type for writing or reading out information on or from a magnetic track provided to a film using a magnetic head. This invention provides a camera of the type which has a regulating member which contacts an end face, in the widthwise direction, of a film to regulate the position, in the widthwise direction, of the film, and in which a surface portion, near the regulating member, of a surface formed between inner and outer rails of a camera main body is formed at a higher level than that of the remaining surface, thereby minimizing deformation of the film on the surface between the inner and outer rails when the end face of the film is regulated by the regulating member.

84 Claims, 9 Drawing Sheets

CAMERA HAVING MAGNETIC HEAD

This application is a continuation of application No. 08/083,250, filed Jun. 29, 1993, now abandoned.

BACKGROUND OF THE INVENTION

1. Field of the Invention

The present invention relates to a camera for writing and/or reading out information on and/or from a film using a magnetic head.

2. Related Background Art

Conventionally, a camera having a magnetic head for writing information (forming a recording track) or reading out information on or from a magnetic storage portion of a film, and a biasing means which contacts the end face of a film to bias the film in one direction is arranged to have contact portions with the film end face at the two sides (in the film feed direction) of the magnetic head, as described in U.S. Pat. No. 5,028,940. Such an arrangement is to maintain the constant position of a recording track formed on the magnetic storage portion of the film by the magnetic head.

However, in the above prior art, the height of a surface between inner and outer rails of a camera main body is the same as in other prior art techniques, and a gap formed in the direction of thickness of the film between the surface between the inner and outer rails and a film pressure plate has a considerable margin as compared to the thickness of the film. For this reason, upon reception of a strong force from the biasing means, the film is deformed within the margin, and the constant position of the recording track formed on the magnetic storage portion of the film by the magnetic head cannot be maintained (the details will be described later with reference to FIG. 7). When information is read out from the corresponding recording track next time, the position of the magnetic head cannot coincide with that of the recording track, and the information cannot be read out.

If the deformation of the film is always constant, a shift amount between the positions of the magnetic head and the recording track is also constant, and can be corrected. However, the way of deformation of even a single film varies depending on environmental conditions such as the temperature, humidity, and the like, and it is impossible to uniformly correct the deformation.

Another problem will be described below. Conventionally, U.S. Pat. No. 4,972,213 discloses a film with a magnetic storage portion (a film with a transparent magnetic layer on a base surface), and a camera having a magnetic head for recording information (forming a recording track) on the film, and reading out the recorded information. A technique for forming not a single recording track but a plurality of recording tracks on a portion outside a photographing frame of a film by the magnetic head is also disclosed. With this technique, an information amount which can be recorded on each photographing frame is increased by increasing the number of tracks.

As disclosed in the above prior art, information which can be recorded by the magnetic head includes photographing information such as a photographing date, time, the type of illumination light source in a photographing operation, pseudo zoom information, a shutter speed, an aperture value, and the like.

U.S. Pat. No. 4,878,075 discloses a technique wherein film information such as a film speed, the regulated number of frames of a film, and the like is written in advance in a film, a camera reads out this information using a magnetic head before a photographing operation, and the information is rewritten with another information in a film wind-up operation after each photographing operation.

The above U.S. Pat. No. 4,878,075 also discloses a technique wherein a camera records exposure information indicating that a corresponding photographing frame has already been photographed as a part of photographing information in units of photographing frames, and when the film is rewound before all frames are photographed, its use is temporarily interrupted, and is then loaded in the same or another camera, the presence/absence of the exposed information in units of photographing frames is detected to automatically restart a photographing operation from a non-exposed photographing frame (to be referred to as a head search function upon re-loading of a film hereinafter). This function is achieved when photographing information recorded by a camera is read out by the camera upon re-loading of a film.

Japanese Patent Application No. 3-122997 proposes a magnetic head for a camera, which comprises a plurality of track forming portions, at least one of which is commonly used for a read-out operation, for forming recording tracks on a magnetic storage portion on the film and reading out information from a pre-recorded track, so that the track forming portion, commonly used for the read-out operation, of the plurality of track forming portions is arranged at a side farthest from a photographing frame of the film.

On the other hand, a magnetic layer on the base surface side of a film is formed on the entire base surface side including a photographing frame portion (U.S. Pat. No. 4,972,213). For this reason, in order to prevent image quality of a taken photograph from deteriorating by the magnetic layer, a very small amount of magnetic particles are filled in the magnetic layer. Therefore, a very low signal output is obtained when the camera reads out film information. Since the camera has a magnetic noise source such as a film feed motor near the magnetic head, a sufficient S/N ratio upon reading cannot be assured in combination with the very low signal output.

In order to read out film information written in advance in a magnetic storage portion (magnetic layer) of a film or to write photographing information in the magnetic layer in synchronism with a photographing operation using the magnetic head arranged in the camera, the film must travel while the magnetic head (i.e., its track forming portion) is in tight contact with the magnetic storage portion. For this purpose, the camera normally has an arrangement for elastically clamping a film by the magnetic head arranged on the base surface side of the film and a pad arranged at a position opposing the magnetic head on the emulsion surface side of the film. Therefore, scratches and a contact fogging portion (a portion exposed by a pressure) due to a clamping pressure are formed on a sliding contact portion between the film and the magnetic head. For this reason, the camera must perform the read operation of film information and the write operation of photographing data on a portion outside a photographing frame of the film.

However, when a plurality of recording tracks are formed on a portion outside a photographing frame of the film, a spacing loss between the magnetic head and the film easily occurs at the edge (end face) of the film due to warp caused by a curling behavior of the film, attachment of dust particles upon cutting a wide film into a 35-mm width, and deformation of the film end face caused by cutting. Therefore, when the track forming portion, which is commonly used for the read-out operation, and is easily influenced by the spacing loss, is arranged near the edge of the film like in the prior art, the originally low signal output is further lowered, thus posing the following problems. That is, the camera reads out wrong information upon loading of a film, or the feed power and durability are impaired when the contact pressure between the magnetic head and the film is increased so as to eliminate the influence of the spacing loss.

SUMMARY OF THE INVENTION

One aspect of the application is to provide a camera, which can minimize deformation of a film caused by biasing means, and can always maintain the position of a recording track formed by a magnetic head constant.

One aspect of the application is to provide a camera wherein a surface portion, near a film contact portion of biasing means, of a surface between inner and outer rails of a camera main body is formed at a higher level than the remaining surface portion, so as to decrease a margin allowing deformation of a film on the surface between the inner and outer rails when the film is biased by the film contact portion of the biasing means.

One aspect of the application is to provide a camera wherein in a head having a plurality of track forming portions for recording information on a magnetic storage portion of a film, and reading out information from the storage portion, a track forming portion used for both the read-out and recording operations is arranged nearer a photographing frame of the film than track forming portions exclusively used for recording, so that the read-out operation can be performed at a position where the deformation of the film end face due to warp caused by the curling behavior of the film is smallest.

Other objects of the present invention will become apparent from the following description of the embodiment taken in conjunction with the accompanying drawings.

DESCRIPTION OF THE EMBODIMENTS OF THE PREFERRED INVENTION

The preferred embodiments of the present invention will be described below with reference to the accompanying drawings.

Figure 1:
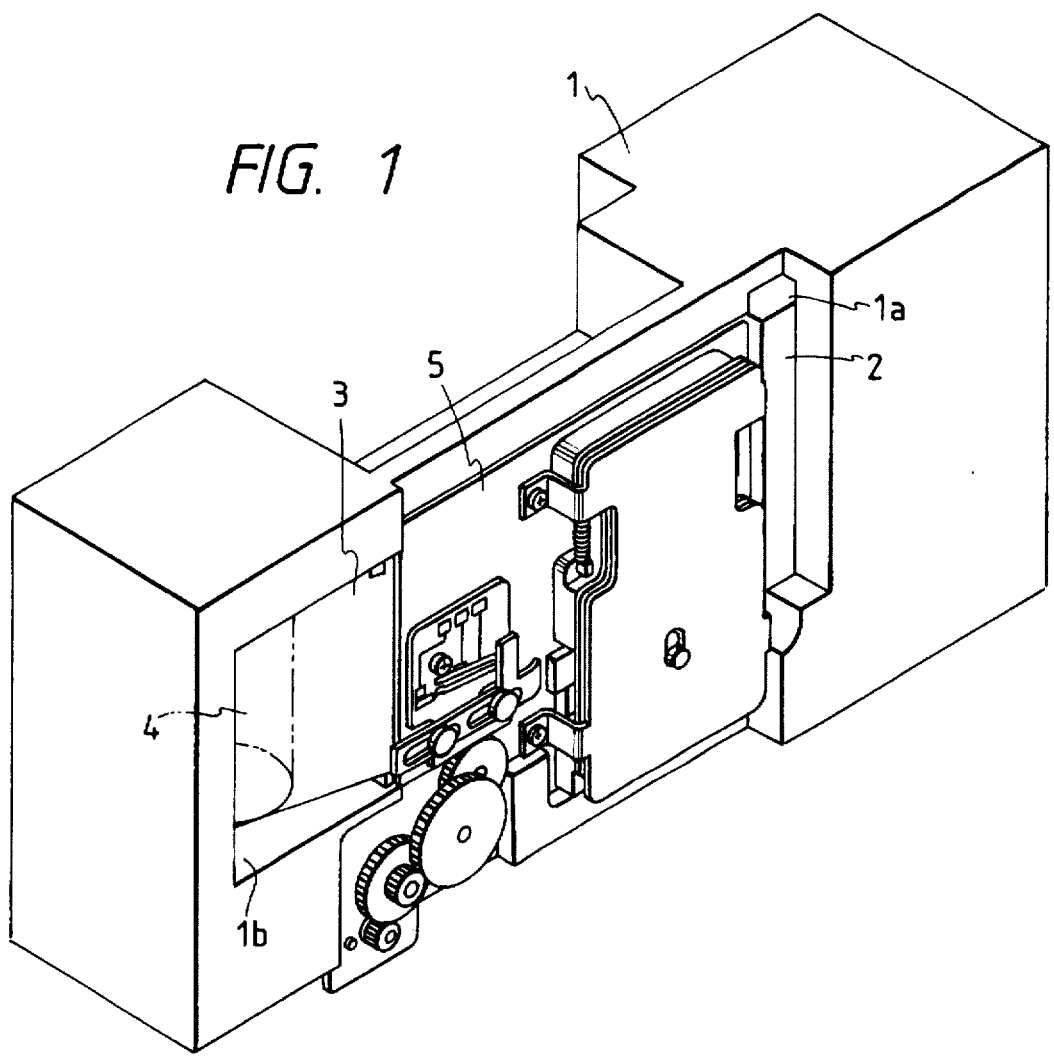
FIG. 1 is a perspective view showing an arrangement of main part of a camera according to the first embodiment of the present invention.
Figure 2:
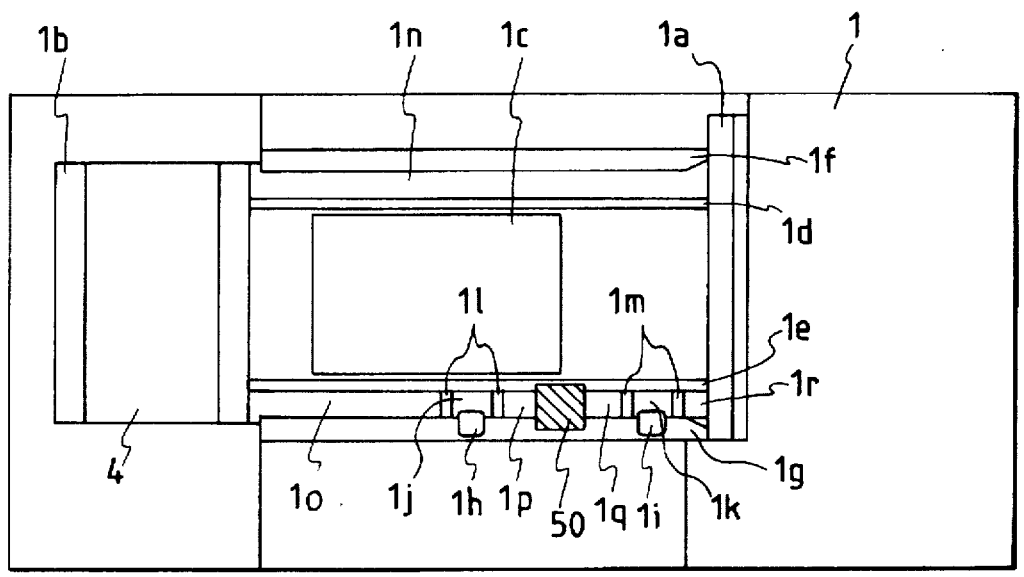
FIG. 2 is a rear view of the camera shown in FIG. 1 from which a film pressure plate unit is detached.

FIGS. 1 to 6B show an arrangement of main part of a camera according to the first embodiment of the present invention. FIG. 1 is a perspective view of the camera, and FIG. 2 is a rear view showing a state wherein a film pressure plate unit is detached from the camera shown in FIG. 1.

In FIGS. 1 and 2, a camera main body 1 has a cartridge chamber 1a, a spool chamber 1b, an aperture 1c, inner rails 1d and 1e, and outer rails 1f and 1g. The camera main body 1 also has escape holes 1h and 1i allowing insertion of guide shafts projecting from a magnetic head (to be described later), and raised surfaces 1j and 1k formed at a higher level than those of surfaces 1n, 1o, 1p, 1q, and 1r between the inner rails 1d and 1e and the outer rails 1f and 1g. Note that these surfaces 1j and 1k may be formed at the same level as that of the inner rails 1d and 1e. The camera main body 1 further has inclined surfaces 1l and 1m for smoothly connecting steps between the surfaces 1o to 1r and the surfaces 1j and 1k. These inclined surfaces 1l and 1m are formed to prevent the leading end of a film from being caught by the steps when the leading end is moved from a film cartridge toward a spool in an auto-loading operation of the film.

A film cartridge 2 is loaded in the cartridge chamber 1a, and incorporates a film 3 having a magnetic storage portion. A spool 4 of the camera is rotated by a motor and a transmission gear train (neither are shown) to take up the film 3. A film pressure plate 5 is fixed to the camera main body 1 by screws. A pressing pad 50 consists of an elastic material, and is used for bringing the film 3 into tight contact with a magnetic head (to be described later).

Figure 3:
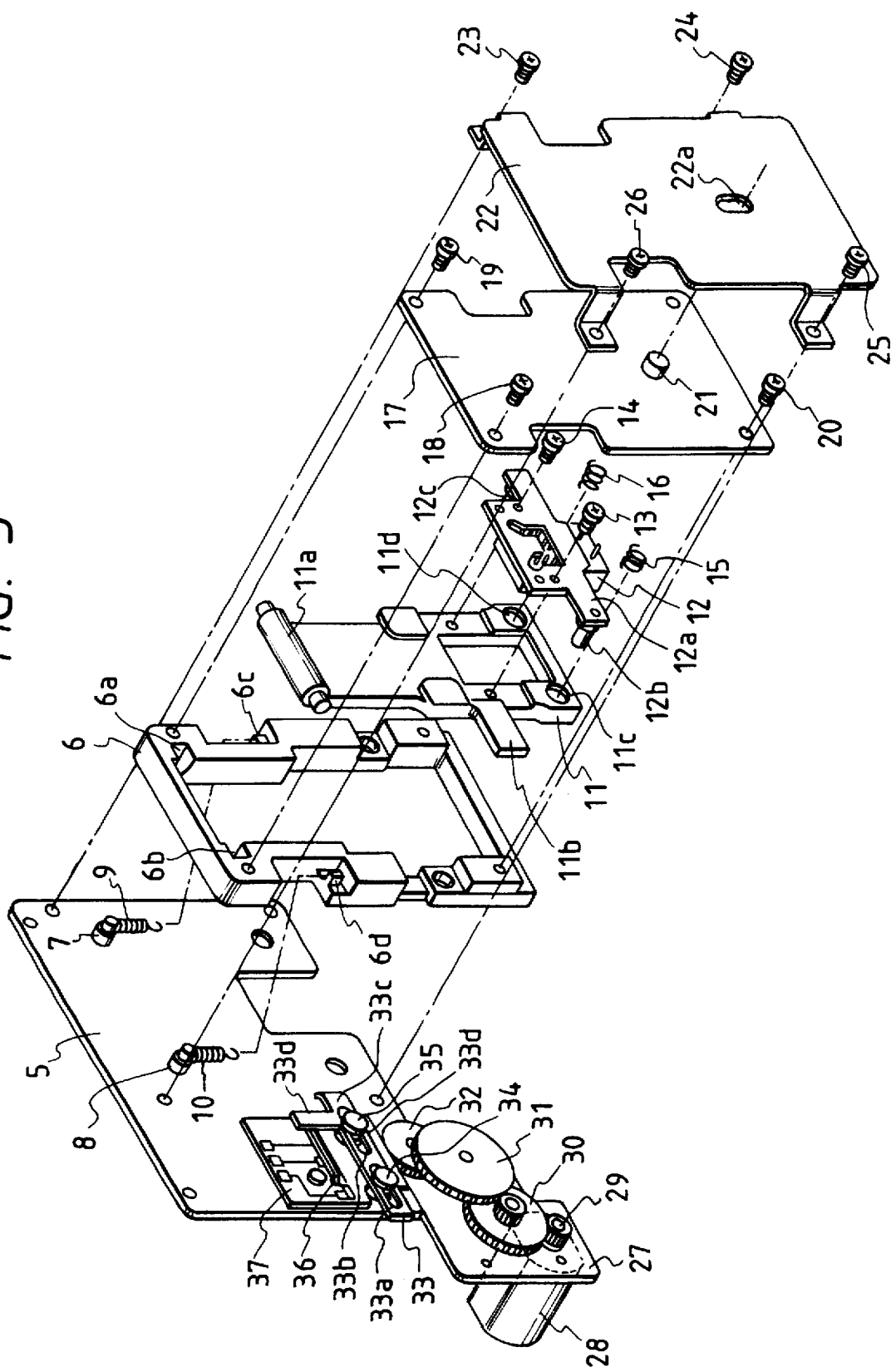
FIG. 3 is an exploded perspective view of a film pressure plate unit shown in FIG. 1.

FIG. 3 is an exploded perspective view showing the film pressure plate 5 detached from the camera main body 1.

In FIG. 3, a slide holder 6 has bearing portions 6a and 6b, and spring hook portions 6c and 6d. Spring hook shafts 7 and 8 project from the film pressure plate 5. Slide springs 9 and 10 are hooked respectively between the spring hook portion 6c and the spring hook shaft 7 and between the spring hook portion 6d and the spring hook shaft 8. These slide springs bias the slide holder 6 upward. A head holder 11 has a pivot shaft 11a, an arm 11b, and spring receiving portions 11c and lid. The pivot shaft 11a extends parallel to the film feed direction, and is pivotally held by the bearing portions 6a and 6b of the slide holder 6. A magnetic head 12 is used for writing and reading out information in and from the magnetic storage portion of the film 3. The magnetic head 12 integrally has a mounting base plate 12a and guide shafts 12b and 12c, and is fixed to the head holder 11 by screws 13 and 14 together with these components. These guide shafts 12b and 12c allow the magnetic head 12 to follow the inclination of the film 3 and are preferably separated from each other in the film feed direction as much as possible.

Pressing springs 15 and 16 have one-end portions respectively contacting the spring receiving portions 11c and 11d of the head holder 11, and bias the head holder 11 to pivot about the pivot shaft 11a, thereby pressing the magnetic head 12 against the film 3. A spring pressing member 17 is fixed to the slide holder 6 by screws 18, 19, 20, and the like, and receives one-end portions of the pressing springs 15 and 16. A slide guide shaft 21 projects from the spring pressing member 17. A slide guide 22 is fixed to the film pressure plate 5 by screws 23 to 26, and has an elongated hole 22a for guiding the slide guide shaft 21 to be slidable in the vertical direction and to be pivotal.

A motor base plate 27 is fixed to the camera main body 1. A motor 28 is fixed to the motor base plate 27. A pinion gear 29 is fixed to the output shaft of the motor 28. The pinion gear 29 is threadably engaged with a two-stage gear 31 via a two-stage gear 30. An idle gear 32 is meshed with a small gear (not shown) of the two-stage gear 31. A slide lever 33 includes a rack portion 33d meshing with the idle gear 32, and has elongated holes 33a and 33b, a tapered portion 33c, and an arm 33d. Guide shafts 34 and 35 are fixed to the film pressure plate 5, and are fitted in the above-mentioned elongated holes 33a and 33b to hold the slide lever 33 to be slidable in the right-and-left direction in FIG. 3. A phase contact 36 is fixed to the arm 33d of the slide lever 33. A phase board 37 is fixed to the film pressure plate 5, and detects the right and left end positions of the slide lever 33 together with the phase contact 36.

Figure 4:
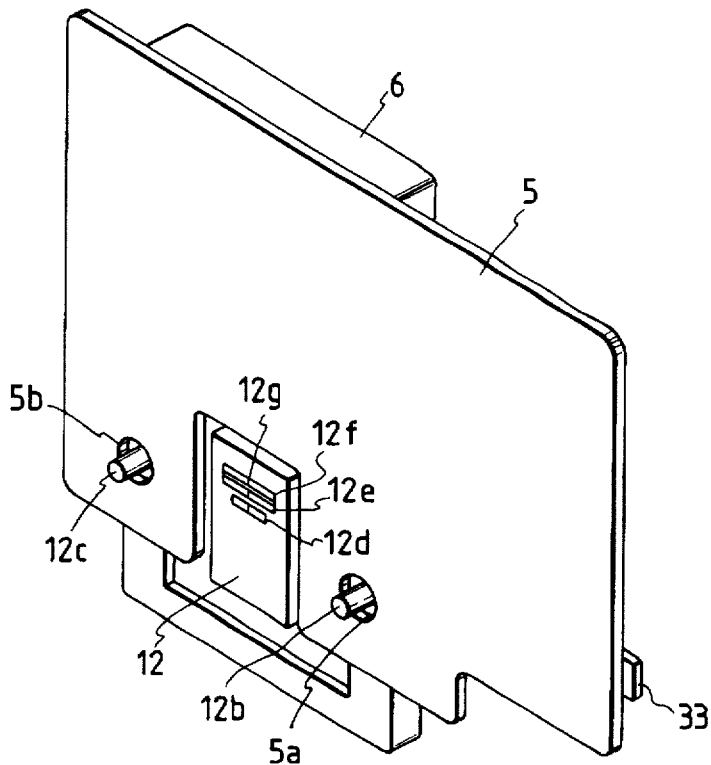
FIG. 4 is a perspective view showing the film pressure plate unit shown in FIG. 1 when viewed from the film surface side.

FIG. 4 is a perspective view of the film pressure plate unit shown in FIG. 3 when viewed from the film surface side.

The above-mentioned magnetic head 12 has a first track forming portion 12d, a second track forming portion 12e, and a third track forming portion 12f. Each of the track forming portions 12d to 12f has a gap portion 12g extending in a direction perpendicular to the film feed direction. The width of each of the track forming portions 12d to 12f is about 0.5 to 1 mm, and the width of each gap portion 12g is several microns. The guide shafts 12b and 12c are kept in contact with the lower end face of the film 3 by the slide springs 9 and 10 (see FIG. 3) via hole portions 5a and 5b formed in the film pressure plate 5.

Figure 5:
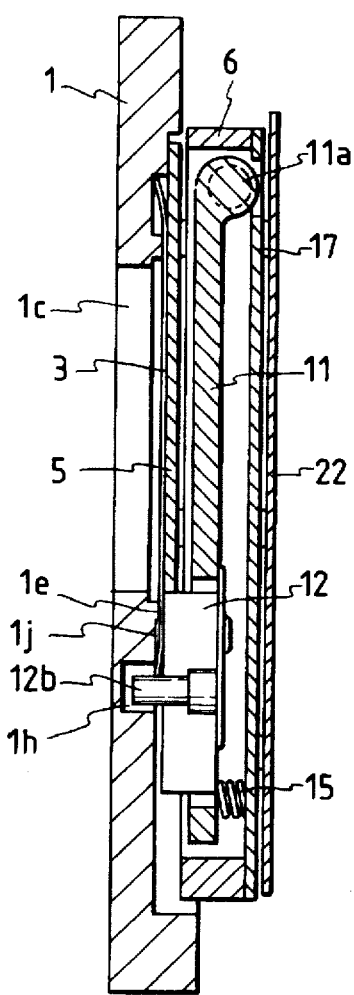
FIG. 5 is a longitudinal sectional view showing an arrangement of an main part of FIG. 1.

FIG. 5 is a longitudinal sectional view near the guide shaft 12b of the magnetic head 12. Since the surface 1j between the inner rail 1e and the outer rail 1g is formed to have a large height, as has been described above with reference to FIG. 2, even when the lower end face of the film 3 is biased upward in FIG. 5 by the guide shaft 12b, the lower end portion of the film 3 is not almost deformed. Therefore, the following conventional problems can be solved.

Figure 7:
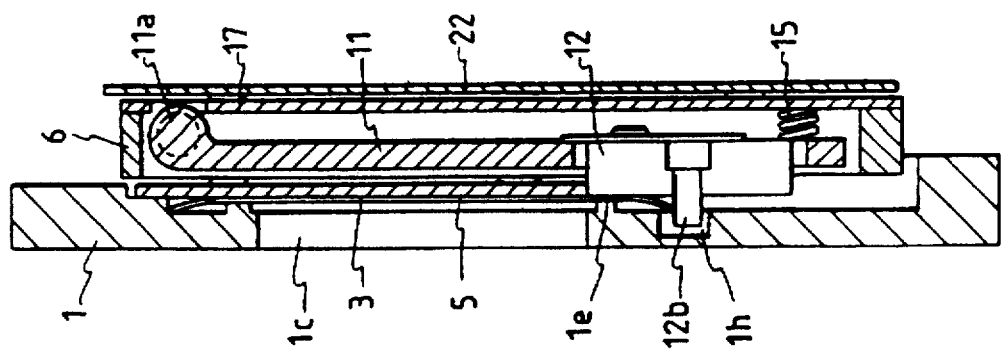
FIG. 7 is a longitudinal sectional view showing an arrangement of the main part of a conventional camera in correspondence with FIG. 5.

More specifically, in the conventional camera, as shown in FIG. 7, a gap in the direction of thickness of the film 3 formed between the film pressure plate 5 and the surface between the inner rail 1e and the outer rail (not shown) of the camera main body 1 has a considerable margin with respect to the thickness of the film 3. For this reason, upon reception of a strong force from the guide shaft 12b, the contact portion of the film 3 is deformed within the margin, and the position of a recording track formed on the magnetic storage portion of the film 3 by the magnetic head 12 cannot be maintained constant. When information is read out from the information track next time, the positions of the magnetic head 12 and the recording track cannot coincide with each other, and information cannot be read out.

With the above-mentioned arrangement, the gap portions 12g of the magnetic head 12 are pivoted about the pivot shaft 11a by the pressing springs 15 and 16, and are always elastically pressed in the film surface direction. Therefore, even when the film 3 is displaced in the direction of thickness of the film 3 between a step portion (tunnel portion) between the inner rail 1e and the outer rail 1g of the camera main body 1, the gap portions 12g of the magnetic head 12 are always kept in tight contact with the magnetic storage portion of the film 3 without being shifted.

Figure 6A:
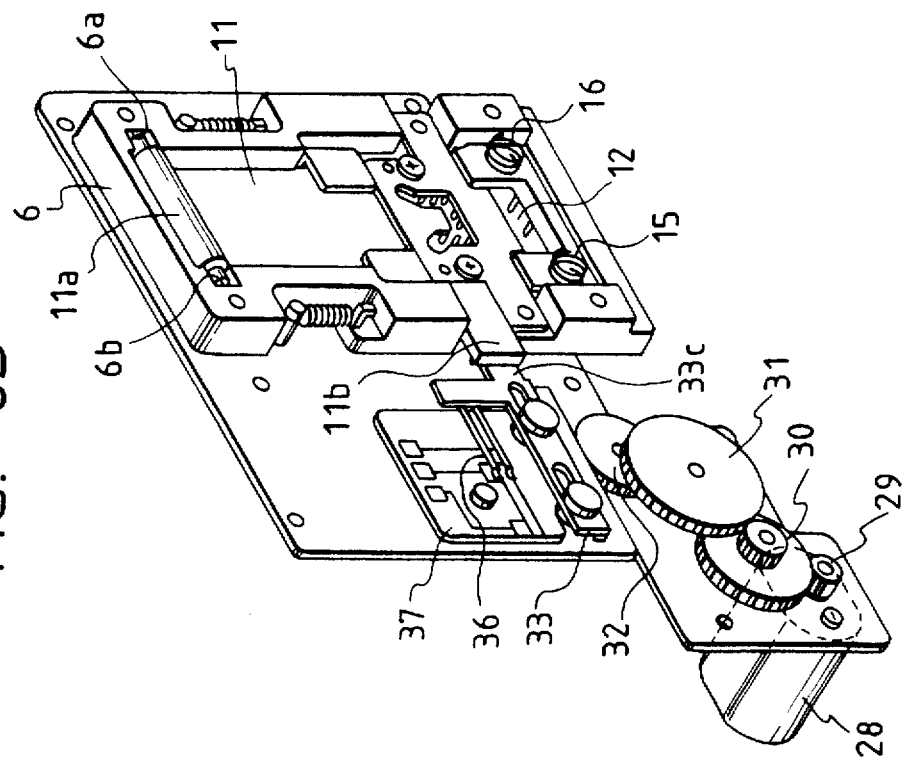
FIG. 6A is a perspective view showing a state during a film feed operation of the main part portion of the camera according to the first embodiment of the present invention.

FIG. 6A is a perspective view showing states of the respective members during a film feed operation, i.e., when the magnetic head 12 writes or reads out information in or from the magnetic storage portion of the film 3.

When the magnetic head 12 writes or reads out information in or from the magnetic storage portion of the film 3, the motor 28 is driven clockwise in FIG. 6A. The slide lever 33 begins to slide leftward via the transmission gears 30 to 32. When the phase contact 36 and the phase board 37 detect that the slide lever 33 has reached the left end position, the drive operation of the motor 28 is stopped. Thus, since the slide lever 33 does not pose any influence on the head holder 11, the magnetic head 12 (i.e., its gap portions 12g) is pressed against the film 3 (i.e., its magnetic storage portion) by the elastic forces of the pressing springs 15 and 16, as described above.

Figure 6B:
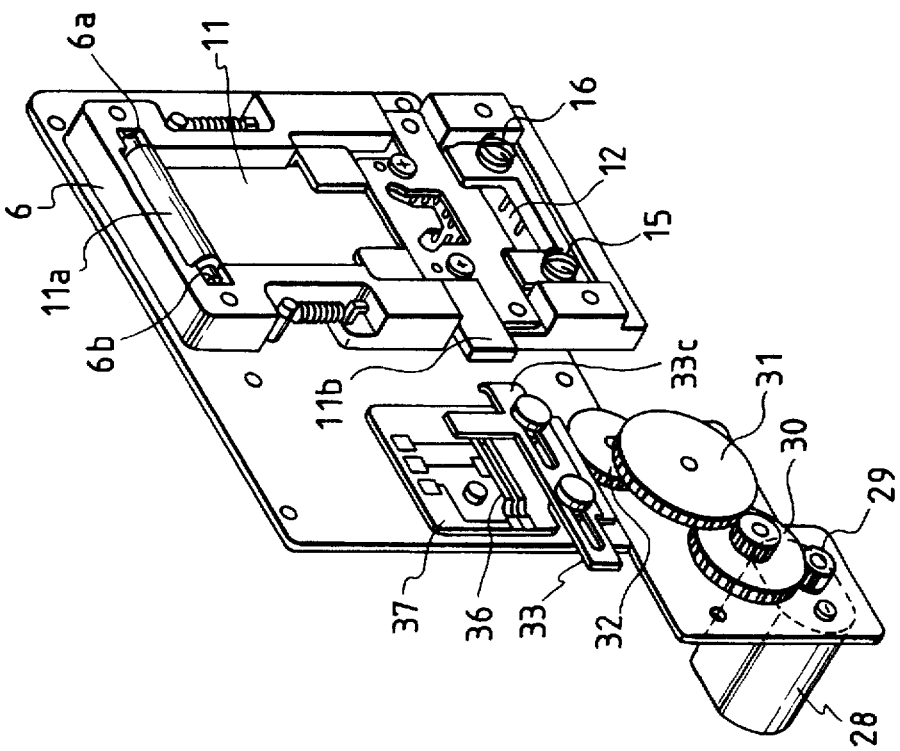
FIG. 6B is a perspective view showing a state during a film exposure operation of the main part portion of the camera according to the first embodiment of the present invention.

FIG. 6B is a perspective view showing a state during an exposure operation onto the film 3.

Upon execution of exposure onto the film 3, the motor 28 is driven counterclockwise in FIG. 6B. The slide lever 33 begins to slide rightward in FIG. 6B via the transmission gears 30 to 32. At this time, the tapered portion 33c of the slide lever 33 enters below the arm 11b of the head holder 11, and pushes up the arm 11b, thereby pivoting the head holder 11 about the pivot shaft 11a against the elastic forces of the pressing springs 15 and 16. Thus, the magnetic head 12 is released from the contact state with the film 3. This is to prevent an adverse effect on the flatness of the film 3 caused by pressing the magnetic head 12 against the film 3 during exposure.

Needless to say, in order to maintain a constant contact state between the magnetic head 12 and the film 3 even when the film 3 is displaced in the direction of thickness, the pivot shaft 11a of the head holder 11 is preferably separated from the magnetic head 12 as much as possible.

Figure 8:
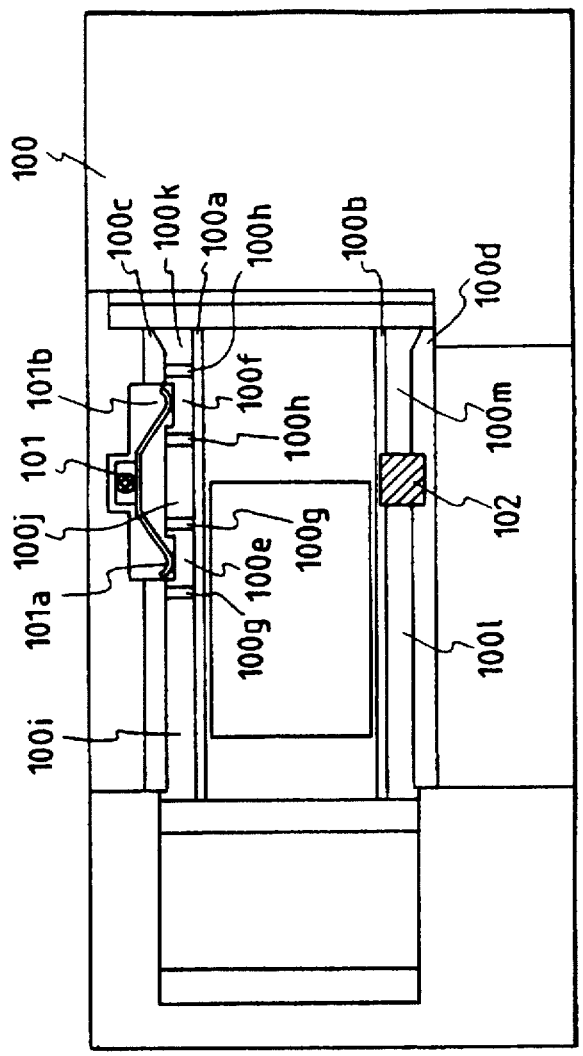
FIG. 8 is a rear view showing an arrangement of main part of a camera according to the second embodiment of the present invention.

FIG. 8 is a back view showing a camera according to the second embodiment of the present invention, from which a back lid and a film pressure plate are detached.

Note that a difference from the first embodiment is that a magnetic head has no contact portion contacting the film end face. Therefore, the camera of the second embodiment has no biasing means for biasing a film upward via the contact portion of the magnetic head.

In FIG. 8, a camera main body 100 has inner rails 100a and 100b, outer rails 100c and 100d, surfaces 100e and 100f formed at a higher level than those of surfaces 100i to 100m between the inner rails 100a and 100b and the outer rails 100c and 100d, and inclined surfaces 100g and 100h for smoothly connecting steps between the surfaces 100e and 100f and the surfaces 100i to 100k. These inclined surfaces 100g and 100h are formed to prevent the leading end of a film from being caught by the steps when the leading end is moved from a film cartridge toward a spool in an autoloading operation of the film.

A leaf spring 101 is fixed to the camera main body 100, and contact portions 101a and 101b of the leaf spring 101 contact the upper end face of a film (not shown) to elastically bias the film downward (FIG. 8). A pressing pad 102 is arranged at a position opposing a magnetic head (not shown) to sandwich the film therebetween.

As described above, since the contact portions 101a and 101b of the leaf spring 101 contact the upper end face of a film (not shown) to elastically bias the film downward (FIG. 8), the widthwise movement of the film is restricted, and the position of a recording track formed by the magnetic head can be always maintained constant.

Figure 9:
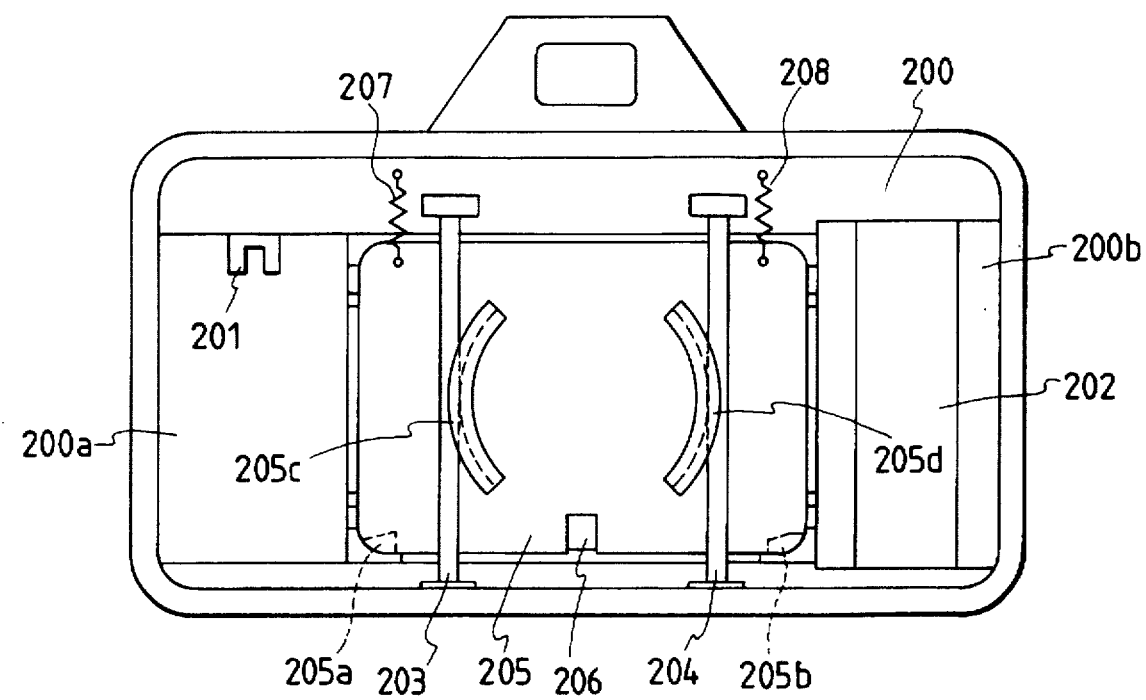
FIG. 9 is a back view showing a camera according to the third embodiment of the present invention, from which a back lid is detached.
Figure 10:
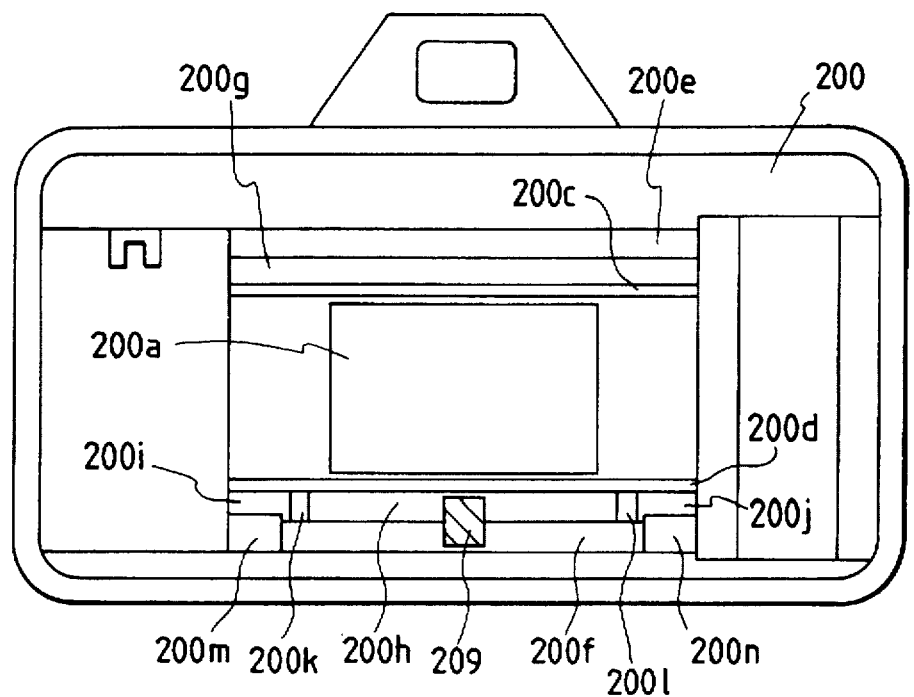
FIG. 10 is a back view of the camera shown in FIG. 9, from which a film pressure plate is detached.

FIGS. 9 and 10 show an arrangement of main part of a camera according to the third embodiment of the present invention. FIG. 9 is a back view showing a camera main body assembled with a film pressure plate, and FIG. 10 is a back view of the camera from which the film pressure plate is detached.

In FIGS. 9 and 10, a camera main body 200 has a cartridge chamber 200a, a spool chamber 200b, inner rails 200c and 200d, outer rails 200e and 200f, surfaces 200i and 200j formed at a higher level than those of surfaces 200g and 200h between the inner rails 200c and 200d and the outer rails 200e and 200f, inclined surfaces 200k and 200l for smoothly connecting steps between the surface 200h and the surfaces 200i and 200j, and escape grooves 200m and 200n for receiving film contact portions provided to a film pressure plate (to be described later).

The camera has a fork 201, a spool 202, and guide shafts 203 and 204 fixed to the camera main body 200. A film pressure plate 205 has contact portions 205a and 205b contacting the lower end face of a film, and engaging portions 205c and 205d, engaging with the guide shafts 203 and 204, for restricting the vertical movement and rotation on a plane parallel to the film surface. The camera also has a magnetic head 206 fixed to the film pressure plate 205, biasing springs 207 and 208, hooked between the camera main body 200 and the film pressure plate 205, for biasing the film pressure plate 205 upward, and a pressing pad 209 for clamping the film between itself and the magnetic head 206.

According to the first and third embodiments described above, since the surface portion between the inner and outer rails of the camera main body and near a film contact portion as biasing means is formed at a higher level than the remaining surface portion, deformation of a film by the biasing means is minimized, and the position of a recording track formed on the magnetic storage portion of the film by the magnetic head can be maintained constant. Therefore, when information recorded on the film is read, a read error caused by a noncoincidence between the positions of the recording track and the magnetic head can be prevented.

The same effect as described above can be obtained by uniformly increasing the height of the surface between the inner and outer rails. In this case, since a contact area with the film surface is increased, the load of the film feed operation is undesirably increased. However, according to this embodiment, since only the surface portion near the film contact portion is formed at a higher level than the remaining surface portion, the above-mentioned effect can be obtained without almost changing the film load.

Also, since the steps between the surface portion having the increased height and the remaining surface portion between the inner and outer rails are connected by the inclined surfaces, the leading end of a film can be prevented from being caught by the steps in an auto-loading operation of a film.

According to the second embodiment, the camera has the biasing means for biasing the film end face opposite to the side of the magnetic head (in the widthwise direction of a film) without arranging any contact portion contacting the film end face, and the biasing means contacts the upper end face of a film (not shown) to elastically bias the film downward (FIG. 8), thereby restricting widthwise movement of the film. Therefore, the position of a recording track formed by the magnetic head can always be maintained constant.

Figure 12:
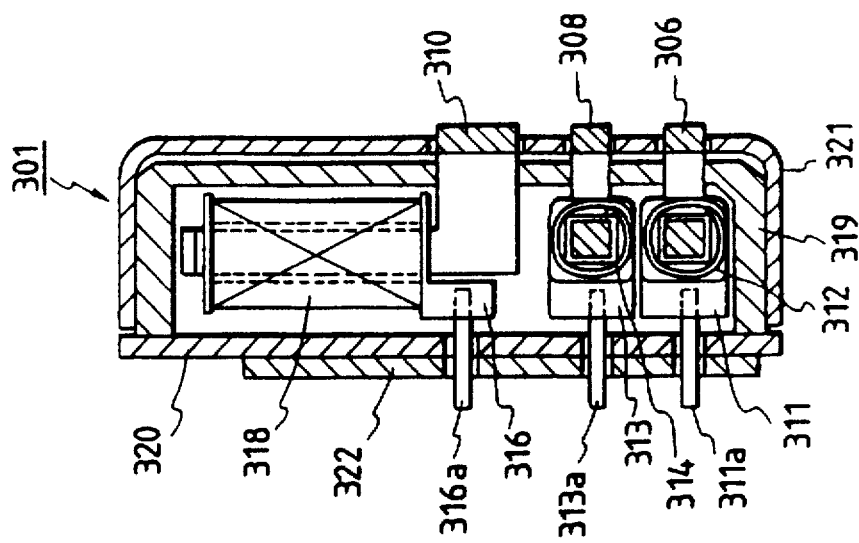
FIG. 12 is a sectional view taken along a line 12—12 in FIG. 11.
Figure 11:
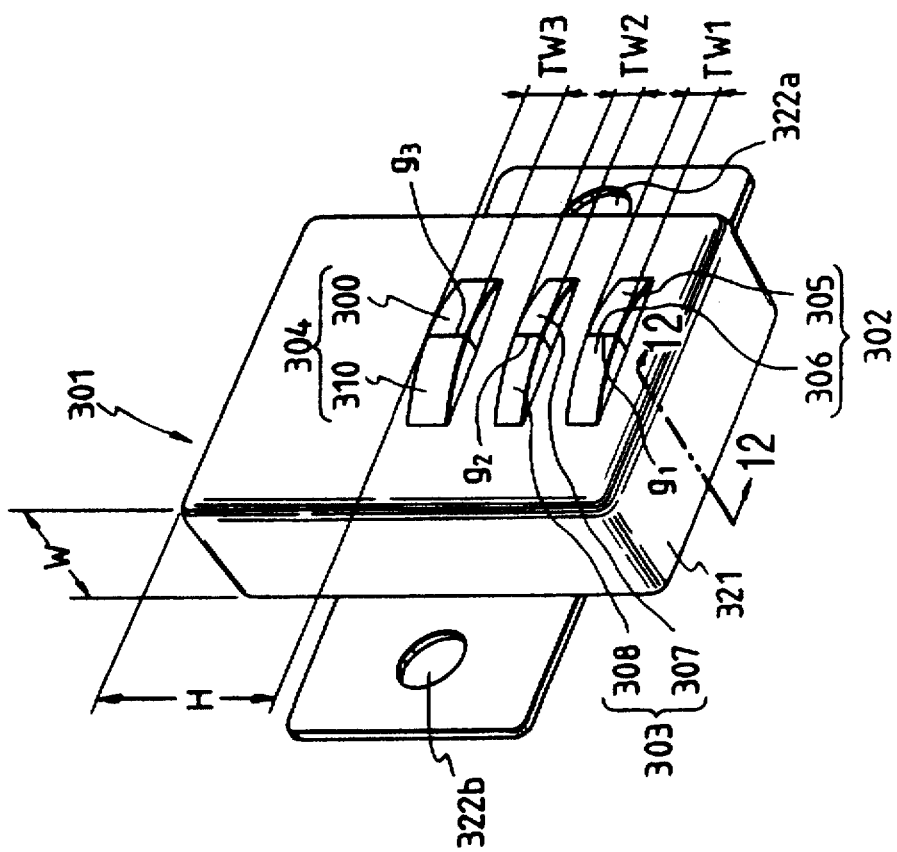
FIG. 11 is a perspective view showing a magnetic head for a camera according to the fourth embodiment of the present invention.
Figure 13:
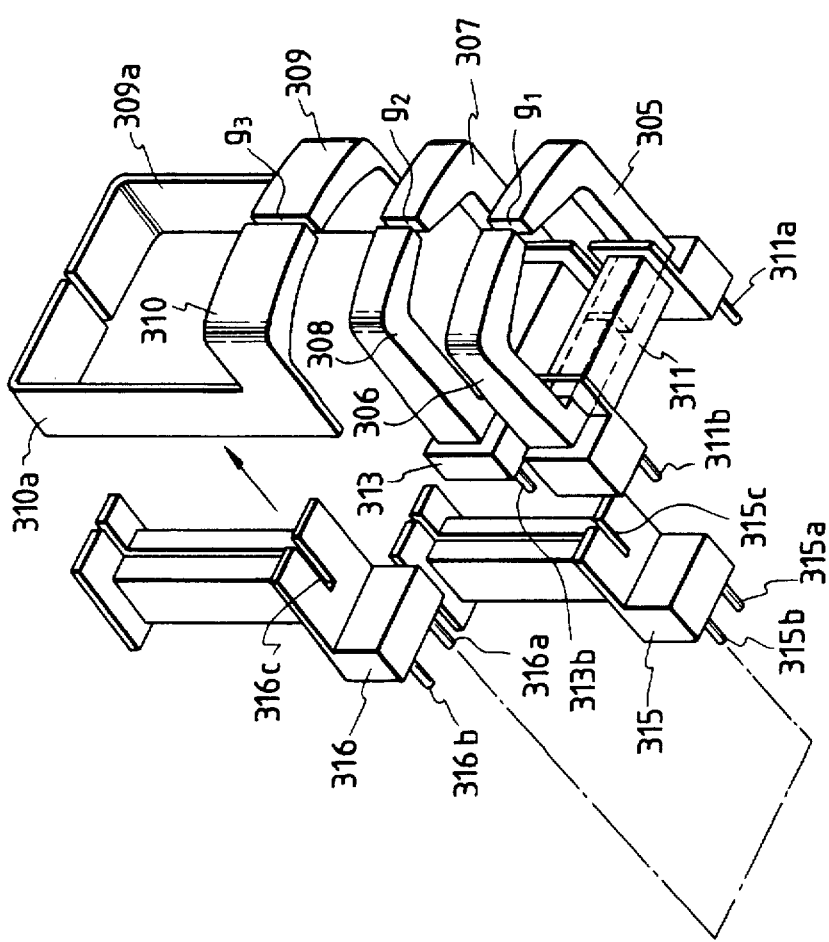
FIG. 13 is a perspective view showing an arrangement of main part of the magnetic head for a camera shown in FIG. 11.

FIGS. 11 to 13 show a magnetic head for a camera according to the fourth embodiment of the present invention. FIG. 11 shows an outer appearance of the magnetic head, FIG. 12 is a sectional view taken along a line 12—12 in FIG. 11, and FIG. 13 shows an arrangement of main part of the magnetic head.

In FIGS. 11 to 13, a magnetic head 301 has first to third track forming portions 302, 303, and 304 for respectively forming independent recording tracks. The first and second track forming portions 302 and 303 are used only in a recording operation. The third track forming portion 304 is used not only in a recording operation but also in a reproduction operation. Note that the widths of the track forming portions 302 to 304 satisfy "TW1=TW2<TW3".

The first track forming portion 302 comprises two cores 305 and 306 which are held to form a magnetic gap $g_1$ therebetween, and consist of a material such as permalloy having a high magnetic permeability and a high saturated magnetic density. Similarly, the second track forming portion 303 comprises two cores 307 and 308 which are held to form a magnetic gap $g_2$ therebetween, and consist of a material such as permalloy. The third track forming portion 304 comprises two cores 309 and 310 which are held to form a magnetic gap $g_3$ therebetween, and consist of a material such as permalloy.

The above-mentioned cores 305 and 307, and 306 and 308 have the same shapes, and the first and second track forming portions 302 and 303 have the same arrangement.

A coil 312 is wound around a bobbin 311 for the first track forming portion 302, and is connected to bobbin terminals 311a and 311b. Then, the cores 305 and 306 are fitted in the bobbin 311, as shown in FIG. 13. When the camera intermittently energizes the coil 312 via the bobbin terminals 311a and 311b, magnetic recording is performed on a film via the magnetic gap $g_1$.

Also, a coil 314 is wound around a bobbin 313 for the second track forming portion 303, and is connected to bobbin terminals 313a and 313b. These components constitute the same arrangement as that of the first track forming portion 302.

Since the first and second track forming portions 302 and 303 are exclusively used for recording, their widths TW1 and TW2 can be small. The number T of turns of each of the coils 312 and 314 can also be relatively small.

The third track forming portion 304 has two bobbins 315 and 316. The bobbin 315 is fitted in a linear portion 309a of the core 309 via its slit 315c, and the bobbin 316 is fitted in a linear portion 310a of the core 310 via its slit 316c. Thereafter, a coil 317 (not shown) and a coil 318 (see FIG. 12) are respectively wound around the bobbins 315 and 316. The two ends of the coil 317 are connected to bobbin terminals 315a and 315b, and the two ends of the coil 318 are connected to bobbin terminals 316a and 316b. Therefore, in order to perform recording on a film by the third track forming portion 304 via the magnetic gap $g_3$, the camera intermittently energizes the series circuit of the coils 317 and 318 via the bobbin terminals 315a and 315b. When information is read out, a change in magnetic flux in the cores 309 and 310 caused by a film traveling on the magnetic gap $g_3$ is electromagnetically converted by the series circuit of the coils 317 and 318, and the converted signal is supplied to the camera as an electrical signal via the bobbin terminals 315a and 315b.

Since the third track forming portion 304 also serves as a read track, it requires a large width TW3, and a large number T of turns for each of the coils 317 and 318. In this embodiment, since the cores 309 and 310 are formed as bent parts, the large width TW3 can be easily obtained, and the linear portions 309a and 310a can be formed, thus assuring a large space for the coils. Since the coils 317 and 318 can be connected in series with each other, the number T of turns sufficient for the read-out operation can be assured. Since the coil space is assured by means of the linear portions 309a and 310a, a thickness W (FIG. 11) of the magnetic head 301 can be prevented from being increased.

A core support 319 holds, at predetermined positions, the cores 305 and 306 integrated with the bobbin 311, the cores 307 and 308 integrated with the bobbin 313, and the cores 309 and 310 integrated with the bobbins 315 and 316. A board 320 constitutes a housing of the magnetic head 301 together with the core support 319. A shield case 321 consists of a material such as permalloy, and is used for eliminating the influence of external magnetic noise. A mounting plate 322 is used for mounting the magnetic head 301 on the camera, and has two mounting holes 322a and 322b.

Figure 14:
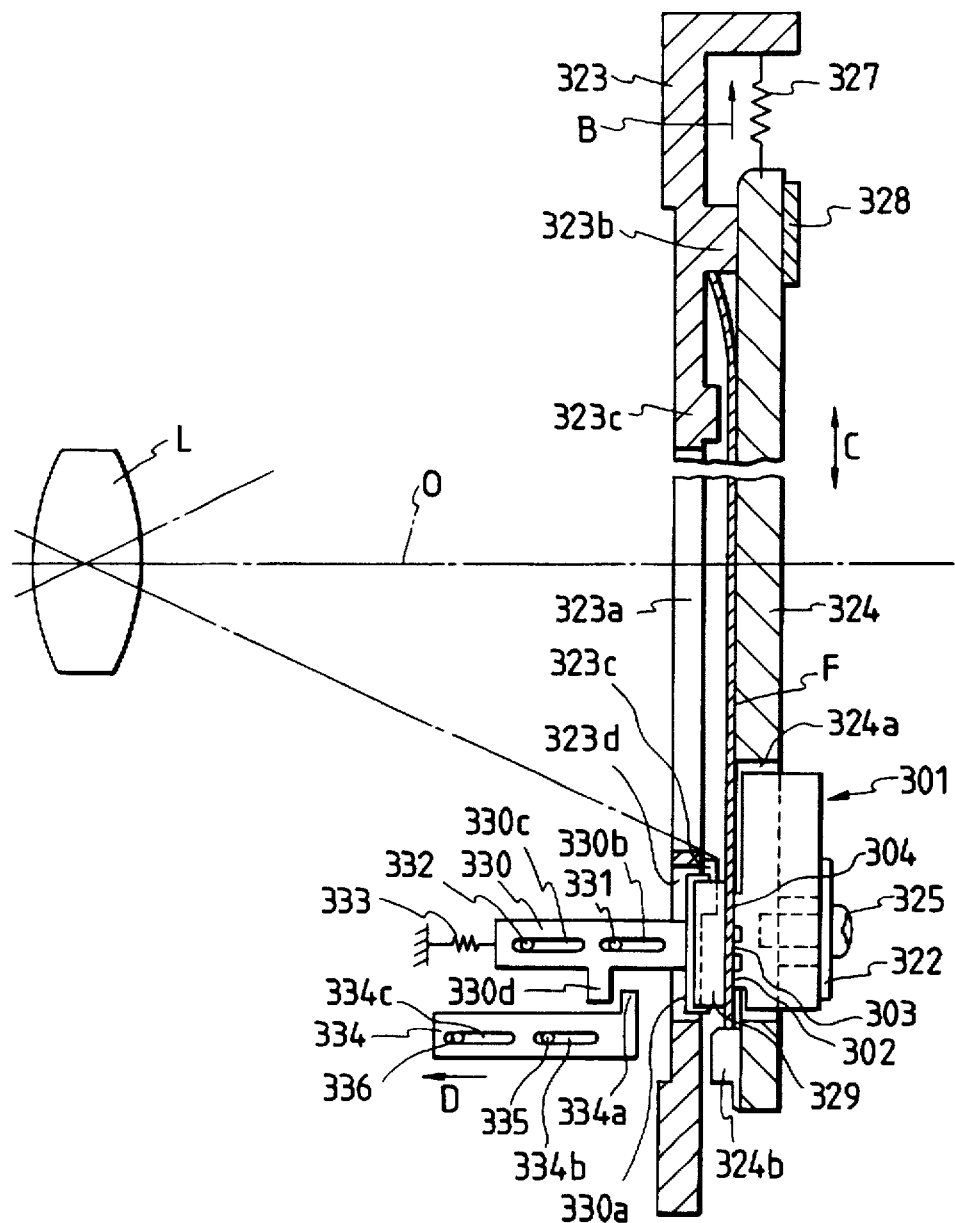
FIG. 14 is a longitudinal sectional view showing a camera comprising the magnetic head shown in FIG. 11.

FIG. 14 is a longitudinal sectional view showing an arrangement of main part of a camera including the above-mentioned magnetic head 301.

In FIG. 14, a camera main body 323 has a known aperture 323a, a pair of upper and lower outer rails 323b, and a pair of upper and lower inner rails 323c (although the pairs of upper and lower inner and outer rails are arranged to sandwich a photographing optical axis O therebetween, both the inner and outer rails are partially cut away and omitted in the lower portion of FIG. 14). A film pressure plate 324 contacts the outer rails 323b. A film F travels a space (tunnel) defined by the outer rails 323b, the inner rails 323c, and the film pressure plate 324, or stops to be subjected to exposure.

The magnetic head 301 is fixed to the film pressure plate 324 by the mounting holes 322a and 322b of the mounting plate 322 and screws 325 and 326 (not shown), and the first to third track forming portions 302 to 304 are located via a notch 324a of the film pressure plate 324 at positions where they are in sliding contact with the film F.

A tension spring 327 biases the film pressure plate 324 in the direction of an arrow B, so that a guide projection 324b of the film pressure plate 324 always contacts the lower end of the film F even when the film F travels between the pair of outer rails 323b while being vibrated in the vertical direction (the direction of an arrow C). A guide member 328 guides movement of the film pressure plate 324 in a gap between itself and the outer rails 323b. This arrangement is to maintain a constant distance between the lower end face of the film F and the first to third track forming portions 302 to 304, i.e., to guarantee the positional precision of the recording tracks on the film surface even when the film F travels while being vibrated in the vertical direction.

A pad 329 consists of an elastic member, and is fixed to a receiving portion 330a of a lever 330. The lever 330 has elongated holes 330b and 330c, which respectively receive pins 331 and 332 fixed to the camera main body 323. The lever 330 is movable in the right-and-left direction in FIG. 14. The lever 330 also has an engaging portion 330d to be engaged with a lever 334 (to be described later). A spring 333 biases the lever 330 rightward in FIG. 14. The traveling film F is always pressed against the first to third track forming portions 302 to 304 by the biasing force of the spring 333 and the pad 329.

Figure 15:
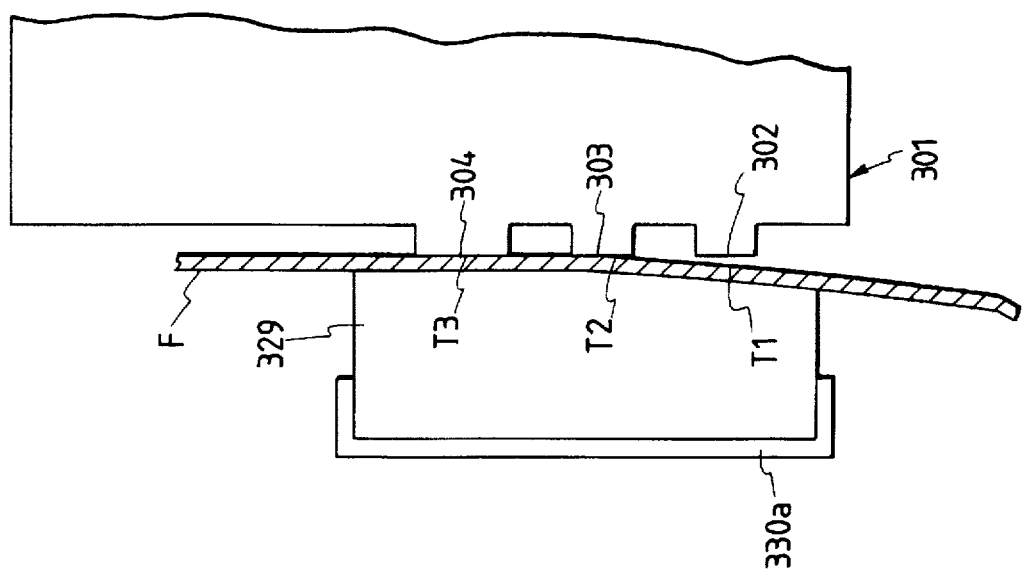
FIG. 15 is a view showing a state during a magnetic recording operation on a film surface using the magnetic head shown in FIG. 11.

FIG. 15 is a detailed view in this case. If a contact surface of the film F with the magnetic head 301, i.e., a contact surface with the magnetic gap $g_1$ is represented by T1, a contact surface with the magnetic gap $g_2$ is represented by T2, and a contact surface with the magnetic gap $g_3$ is represented by T3, the warp amounts of these contact surfaces caused by the curling behavior of the film F satisfy "T1>T2>T3". That is, the flatness of the film F is impaired as the contact surface is separated farther away from the photographing frame.

On the other hand, the magnetic layer of the film F is very thin to prevent deterioration of image quality, and a signal output read by the third track forming portion 304 of the magnetic head 301 is very low. Therefore, the read track and the film F must be kept in tight contact with each other during traveling of the film.

In this embodiment, the third track forming portion 304, which also serves as the read track, is arranged at a position nearest the photographing frame.

Referring back to FIG. 14, the above-mentioned lever 334 is movable in the right-and-left direction in FIG. 14 by means of elongated holes 334b and 334c and pins 335 and 336. When the lever 334 is driven in the direction of an arrow D by a certain means (not shown), it drives the lever 330 in the same direction by the engaging portions 334a and 330d. Thus, a state wherein the pad 329 presses the film F against the magnetic head 301 is released. When neither the read-out operation of magnetically recorded information nor recording are executed, the film is preferably set in this release state. Thus, the film F can be prevented from being deformed when it is pressed against the magnetic head 301 for a long period of time, and the flatness of the film F can be prevented from being impaired by the pad 329 in a photographing exposure operation.

According to the fourth embodiment, since the third track forming portion 304, which also serves as the read track, of the first to third track forming portions is arranged at a position nearest the photographing frame of the film F, as shown in FIG. 15 and the like, magnetic information can be stably read out.

With this arrangement, since a contact force between the magnetic head 301 and the film F can be lowered, feed performance and durability can be improved.

What is claimed is:

1. A camera comprising:
   (a) inner and outer rails arranged along one side of an exposure aperture;
   (b) a guide contact which contacts an edge of a film at a contact position; and
   (c) a guide portion that provides a guide surface between said inner and outer rails, a portion of said guide surface near the contact position having a greater height than a portion of said guide surface spaced apart from the contact position.

2. A camera according to claim 1, wherein the portion of the guide surface near the contact position is at the same level as that of a surface of said inner rail.

3. A camera according to claim 1, wherein said guide surface includes an inclined surface formed between the portion of the guide surface near the contact position and the portion of the guide surface spaced apart from the contact position.

4. A camera according to claim 1, wherein said means for contacting has first and second contact portions contacting the edge of the film, and the portion of the guide surface near the contact position having a greater height than the portion of the guide surface spaced apart from the contact position is provided at a position corresponding to each of said first and second contact portions.

5. A camera according to claim 1, wherein the magnetic head has at least one recording track forming portion and a read track forming portion, and said read track forming portion is arranged at a position nearer said exposure aperture than said recording track forming portion.

6. A camera according to claim 5, wherein said read track forming portion is commonly used as a recording track forming portion.

7. A camera having a magnetic head for writing and/or reading out information to and/or from a magnetic recording portion provided on a film, said camera comprising:
 (a) a pair of inner and outer rails arranged along one side of an exposure aperture and a pair of inner and outer rails arranged along the opposite side of the exposure aperture;
 (b) means for contacting an edge of the film at a contact position, wherein said means for contacting contacts the edge of the film to apply a biasing force in the widthwise direction of the film; and
 (c) means for providing a guide surface between one of said pairs of inner and outer rails, a portion of said guide surface near the contact position having a greater height than a portion of said guide surface spaced apart from the contact position.

8. A camera according to claim 4, wherein the portion of the guide surface near the contact position is at the same level as that of a surface of said inner rails.

9. A camera according to claim 7, wherein said means for providing a guide surface includes an inclined surface formed between the portion of the guide surface near the contact position and the portion of the guide surface spaced apart from the contact position.

10. A camera according to claim 7, wherein said means for contacting has first and second contact portions contacting the edge of the film, and the portion of the guide surface near the contact position having a greater height than the portion of the guide surface spaced apart from the contact position is provided at a position corresponding to each of said first and second contact portions.

11. A camera according to claim 4, wherein said means for contacting is located outside the inner rail of said one pair of inner and outer rails and contacts the edge of the film.

12. A camera according to claim 11, wherein the magnetic head is arranged near the portion of the guide surface near the contact position.

13. A camera according to claim 7, wherein the magnetic head has at least one recording track forming portion and a read track forming portion, and said read track forming portion is arranged at a position nearer said exposure aperture than said recording track forming portion.

14. A camera according to claim 9, wherein said read track forming portion is commonly used as a recording track forming portion.

15. A camera having a head for writing and/or reading out information to and/or from a recording portion provided on a film, said camera comprising:
 (a) inner and outer rails arranged along an exposure aperture;
 (b) means for contacting an edge of a film at a contact position; and
 (c) means for providing a guide surface between said inner and outer rails, a portion of said guide surface near the contact position having a greater height than a portion of said guide surface spaced apart from the contact position.

16. A camera according to claim 15, wherein the portion of the guide surface near the contact position is at the same level as that of a surface of said inner rail.

17. A camera according to claim 15, wherein said means for providing a surface includes an inclined surface formed between the portion of the guide surface near the contact position and the portion of the guide surface spaced apart from the contact position.

18. A camera according to claim 15, wherein said means for contacting has first and second contact portions contacting the edge of the film, and the portion of the guide surface near the contact position having a greater height than the portion of the guide surface spaced apart from the contact position is provided at a position corresponding to each of said first and second contact portions.

19. A camera according to claim 16, wherein the head has at least one recording track forming portion and a read track forming portion, and said read track forming portion is arranged at a position nearer said exposure aperture than said recording track forming portion.

20. A camera according to claim 19, wherein said read track forming portion is commonly used as a recording track forming portion.

21. A camera having a head for writing and/or reading out information to and/or from a recording portion provided on a film, said camera comprising:
 (a) a pair of inner and outer rails arranged along one side of an exposure aperture and a pair of inner and outer rails arranged along the opposite side of the exposure aperture;
 (b) means for contacting an edge of the film at a contact position, wherein said means for contacting contacts the edge to apply a biasing force in the widthwise direction of the film; and
 (c) means for providing a guide surface between one of said pairs of inner and outer rails, a portion of said guide surface near the contact position having a greater height than a portion of said guide surface spaced apart from the contact position.

22. A camera according to claim 21, wherein the portion of the guide surface near the contact position is at the same level as that of a surface of said inner rails.

23. A camera according to claim 21, wherein said means for providing a guide surface includes an inclined surface formed between the portion of the guide surface near the contact position and the portion of the guide surface spaced apart from the contact position.

24. A camera according to claim 21, wherein said means for contacting has first and second contact portions contacting the edge of the film, and the portion of the guide surface near the contact position having a greater height than the portion of the guide surface spaced apart from the contact position is provided at a position corresponding to each of said first and second contact portions.

25. A camera according to claim 21, wherein said means for contacting is located outside the inner rail of said one pair of inner and outer rails and contacts the edge of the film.

26. A camera according to claim 25, wherein the head is arranged near the portion of the guide surface near the contact position.

27. A camera according to claim 21, wherein said head has at least one recording track forming portion and a read track forming portion, and said read track forming portion is arranged at a position nearer said exposure aperture than said recording track forming portion.

28. A camera according to claim 27, wherein said read track forming portion is commonly used as a recording track forming portion.

29. A camera having a head for writing and/or reading out information to and/or from a recording portion provided on an image recording medium, said camera comprising:
  (a) inner and outer rails arranged along an exposure aperture;
  (b) means for contacting an edge of an image recording medium at a contact position; and
  (c) means for providing a guide surface between said inner and outer rails, a portion of said guide surface near the contact position having a greater height than a portion of said guide surface spaced apart from the contact position.

30. A camera according to claim 29, wherein the portion of the guide surface near the contact position is at the same level as that of a surface of said inner rail.

31. A camera according to claim 29, wherein said means for providing a guide surface includes an inclined surface formed between the portion of the guide surface near the contact position and the portion of the guide surface spaced apart from the contact position.

32. A camera according to claim 29, wherein said means for contacting has first and second contact portions contacting the edge of the image recording medium, and the portion of the guide surface near the contact position having a greater height than the portion of the guide surface spaced apart from the contact position is provided at a position corresponding to each of said first and second contact portions.

33. A camera according to claim 29, wherein the head has at least one recording track forming portion and a read track forming portion, and said read track forming portion is arranged at a position nearer said exposure aperture than said recording track forming portion.

34. A camera according to claim 33, wherein said read track forming portion is commonly used as a recording track forming portion.

35. A camera having a head for writing and/or reading out information to and/or from a recording portion provided on an image recording medium, said camera comprising:
  (a) a pair of inner and outer rails arranged along one side of an exposure aperture and a pair of inner and outer rails arranged along the opposite side of the exposure aperture;
  (b) means for contacting an edge of an image recording medium at a contact position, wherein said means for contacting contacts the edge to apply a biasing force in the widthwise direction of the image recording medium; and
  (c) means for providing a guide surface between one of said pairs of inner and outer rails, a portion of said guide surface near the contact position having a greater height than a portion of said guide surface spaced apart from the contact position.

36. A camera according to claim 35, wherein the portion of the guide surface near the contact position is at the same level as that of a surface of said inner rails.

37. A camera according to claim 35, wherein said means for providing a guide surface includes an inclined surface formed between the portion of the guide surface near the contact position and the portion of the guide surface spaced apart from the contact position.

38. A camera according to claim 35, wherein said means for contacting has first and second contact portions contacting the edge of the image recording medium, and the portion of the guide surface near the contact position having a greater height than the portion of the guide surface spaced apart from the contact position is provided at a position corresponding to each of said first and second contact portions.

39. A camera according to claim 35, wherein said means for contacting is located outside the inner rail of said one pair of inner and outer rails and contacts the edge of the image recording medium.

40. A camera according to claim 39, wherein the head is arranged near the portion of the guide surface near the contact position.

41. A camera according to claim 35, wherein said head has at least one recording track forming portion and a read track forming portion, and said read track forming portion is arranged at a position nearer said exposure aperture than said recording track forming portion.

42. A camera according to claim 41, wherein said read track forming portion is commonly used as a recording track forming portion.

43. An apparatus comprising:
  (a) inner and outer rails arranged along one side of an exposure aperture;
  (b) a guide contact which contacts an edge of a film at a contact position; and
  (c) a guide portion that provides a guide surface between said inner and outer rails, a portion of said guide surface near the contact position having a greater height than a portion of said guide surface spaced apart from the contact position.

44. An apparatus according to claim 43, wherein the portion of the guide surface near the contact position is at the same level as that of a surface of said inner rail.

45. An apparatus according to claim 43, wherein said guide surface includes an inclined surface formed between the portion of the guide surface near the contact position and the portion of the guide surface spaced apart from the contact position.

46. An apparatus according to claim 43, wherein said means for contacting has first and second contact portions contacting the edge of the film, and the portion of the guide surface near the contact position having a greater height than the portion of the guide surface spaced apart from the contact position is provided at a position corresponding to each of said first and second contact portions.

47. An apparatus according to claim 43, wherein the magnetic head has at least one recording track forming portion and a read track forming portion, and said read track forming portion is arranged at a position nearer said exposure aperture than said recording track forming portion.

48. An apparatus according to claim 47, wherein said read track forming portion is commonly used as a recording track forming portion.

49. An apparatus having a magnetic head for writing and/or reading out information to and/or from a magnetic recording portion provided on a film, said apparatus comprising:
  (a) a pair of inner and outer rails arranged along one side of an exposure aperture and a pair of inner and outer rails arranged along the opposite side of the exposure aperture;

(b) means for contacting an edge of the film at a contact position, wherein said means for contacting contacts the edge of the film to apply a biasing force in the widthwise direction of the film; and (c) means for providing a guide surface between one of said pairs of inner and outer rails, a portion of said guide surface near the contact position having a greater height than a portion of said guide surface spaced apart from the contact position.

50. An apparatus according to claim 49, wherein the portion of the guide surface near the contact position is at the same level as that of a surface of said inner rails.

51. An apparatus according to claim 49, wherein said means for providing a guide surface includes an inclined surface formed between the portion of the guide surface near the contact position and the portion of the guide surface spaced apart from the contact position.

52. An apparatus according to claim 49, wherein said means for contacting has first and second contact portions contacting the edge of the film, and the portion of the guide surface near the contact position having a greater height than the portion of the guide surface spaced apart from the contact position is provided at a position corresponding to each of said first and second contact portions.

53. An apparatus according to claim 49, wherein said means for contacting is located outside the inner rail of said one pair of inner and outer rails and contacts the edge of the film.

54. An apparatus according to claim 53, wherein the magnetic head is arranged near the portion of the guide surface near the contact position.

55. An apparatus according to claim 49, wherein the magnetic head has at least one recording track forming portion and a read track forming portion, and said read track forming portion is arranged at a position nearer said exposure aperture than said recording track forming portion.

56. An apparatus according to claim 55, wherein said read track forming portion is commonly used as a recording track forming portion.

57. An apparatus having a head for writing and/or reading out information to and/or from a recording portion provided on a film, said apparatus comprising:

(a) inner and outer rails arranged along an exposure aperture;

(b) means for contacting an edge of a film at a contact position; and (c) means for providing a guide surface between said inner and outer rails, a portion of said guide surface near the contact position having a greater height than a portion of said guide surface spaced apart from the contact position.

58. An apparatus according to claim 57, wherein the portion of the guide surface near the contact position is at the same level as that of a surface of said inner rail.

59. An apparatus according to claim 57, wherein said means for providing a surface includes an inclined surface formed between the portion of the guide surface near the contact position and the portion of the guide surface spaced apart from the contact position.

60. An apparatus according to claim 57, wherein said means for contacting has first and second contact portions contacting the edge of the film, and the portion of the guide surface near the contact position having a greater height than the portion of the guide surface spaced apart from the contact position is provided at a position corresponding to each of said first and second contact portions.

61. An apparatus according to claim 57, wherein the head has at least one recording track forming portion and a read track forming portion, and said read track forming portion is arranged at a position nearer said exposure aperture than said recording track forming portion.

62. An apparatus according to claim 61, wherein said read track forming portion is commonly used as a recording track forming portion.

63. An apparatus having a head for writing and/or reading out information to and/or from a recording portion provided on a film, said apparatus comprising:

(a) a pair of inner and outer rails arranged along one side of an exposure aperture and a pair of inner and outer rails arranged along the opposite side of the exposure aperture;

(b) means for contacting an edge of the film at a contact position, wherein said means for contacting contacts the edge to apply a biasing force in the widthwise direction of the film; and (c) means for providing a guide surface between one of said pairs of inner and outer rails, a portion of said guide surface near the contact position having a greater height than a portion of said guide surface spaced apart from the contact position.

64. An apparatus according to claim 63, wherein the portion of the guide surface near the contact position is at the same level as that of a surface of said inner rails.

65. An apparatus according to claim 63, wherein said means for providing a guide surface includes an inclined surface formed between the portion of the guide surface near the contact position and the portion of the guide surface spaced apart from the contact position.

66. An apparatus according to claim 63, wherein said means for contacting has first and second contact portions contacting the edge of the film, and the portion of the guide surface near the contact position having a greater height than the portion of the guide surface spaced apart from the contact position is provided at a position corresponding to each of said first and second contact portions.

67. An apparatus according to claim 63, wherein said means for contacting is located outside the inner rail of said one pair of inner and outer rails and contacts the edge of the film.

68. An apparatus according to claim 67, wherein the head is arranged near the portion of the guide surface near the contact position.

69. An apparatus according to claim 63, wherein said head has at least one recording track forming portion and a read track forming portion, and said read track forming portion is arranged at a position nearer said exposure aperture than said recording track forming portion.

70. An apparatus according to claim 69, wherein said read track forming portion is commonly used as a recording track forming portion.

71. An apparatus having a head for writing and/or reading out information to and/or from a recording portion provided on an image recording medium, said apparatus comprising:

(a) inner and outer rails arranged along an exposure aperture;

(b) means for contacting an edge of an image recording medium at a contact position; and (c) means for providing a guide surface between said inner and outer rails, a portion of said guide surface near the contact position having a greater height than a portion of said guide surface spaced apart from the contact position.

72. An apparatus according to claim 71, wherein the portion of the guide surface near the contact position is at the same level as that of a surface of said inner rail.

73. An apparatus according to claim 71, wherein said means for providing a guide surface includes an inclined surface formed between the portion of the guide surface near the contact position and the portion of the guide surface spaced apart from the contact position.

74. An apparatus according to claim 71, wherein said means for contacting has first and second contact portions contacting the edge of the image recording medium, and the portion of the guide surface near the contact position having a greater height than the portion of the guide surface spaced apart from the contact position is provided at a position corresponding to each of said first and second contact portions.

75. An apparatus according to claim 71, wherein the head has at least one recording track forming portion and a read track forming portion, and said read track forming portion is arranged at a position nearer said exposure aperture than said recording track forming portion.

76. An apparatus according to claim 75, wherein said read track forming portion is commonly used as a recording track forming portion.

77. An apparatus having a head for writing and/or reading out information to and/or from a recording portion provided on an image recording medium, said apparatus comprising:

(a) a pair of inner and outer rails arranged along one side of an exposure aperture and a pair of inner and outer rails arranged along the opposite side of the exposure aperture;

(b) means for contacting an edge of an image recording medium at a contact position, wherein said means for contacting contacts the edge to apply a biasing force in the widthwise direction of the image recording medium; and (c) means for providing a guide surface between one of said pairs of inner and outer rails, a portion of said guide surface near the contact position having a greater height than a portion of said guide surface spaced apart from the contact position.

78. An apparatus according to claim 77, wherein the portion of the guide surface near the contact position is at the same level as that of a surface of said inner rails.

79. An apparatus according to claim 77, wherein said means for providing a guide surface includes an inclined surface formed between the portion of the guide surface near the contact position and the portion of the guide surface spaced apart from the contact position.

80. An apparatus according to claim 77, wherein said means for contacting has first and second contact portions contacting the edge of the image recording medium, and the portion of the guide surface near the contact position having a greater height than the portion of the guide surface spaced apart from the contact position is provided at a position corresponding to each of said first and second contact portions.

81. An apparatus according to claim 77, wherein said means for contacting is located outside the inner rail of said one pair of inner and outer rails and contacts the edge of the image recording medium.

82. An apparatus according to claim 81, wherein the head is arranged near the portion of the guide surface near the contact position.

83. An apparatus according to claim 77, wherein said head has at least one recording track forming portion and a read track forming portion, and said read track forming portion is arranged at a position nearer said exposure aperture than said recording track forming portion.

84. An apparatus according to claim 83, wherein said read track forming portion is commonly used as a recording track forming portion.

* * * * *

UNITED STATES PATENT AND TRADEMARK OFFICE
CERTIFICATE OF CORRECTION

PATENT NO. : 5,761,555

DATED : June 2, 1998

INVENTOR(S) : MASAAKI ISHIHARA, ET AL

Page 1 of 3

It is certified that error appears in the above-identified patent and that said Letters Patent is hereby corrected as shown below:

On the title page,
<u>At [56] Foreign Patent Documents</u>

"0490540  3/1992  Japan" should read --4-90540  3/1992  Japan-- and "5119386  5/1993  Japan" should read --5-119386  5/1993  Japan--.

<u>Column 3</u>

Line 40, "main" should read --a main--.
Line 50, "an main" should read --the main--.
Line 61, "main" should read --a main--.

<u>Column 4</u>

Line 9, "main" should read --a main--.
Line 17, "EMBODIMENTS" should read  --PREFERRED EMBODIMENTS--.
Line 18, "PREFERRED INVENTION" should read --INVENTION--.
Line 63, "lid." should red --11d.--.

UNITED STATES PATENT AND TRADEMARK OFFICE
CERTIFICATE OF CORRECTION

PATENT NO. : 5,761,555
DATED : June 2, 1998
INVENTOR(S) : MASAAKI ISHIHARA, ET AL It is certified that error appears in the above-identified patent and that said Letters Patent is hereby corrected as shown below:

COLUMN 11

Lines 4 to 5, "means for contacting" should read --guide contact--.
Lines 10 to 11, "wherein the magnetic head" should read --further comprising a magnetic head that--.
Line 13, "and" should read --where--.
Line 34, "claim 4," should read --claim 7,--.
Line 48, "claim 4," should read --claim 7,--.

COLUMN 12

Line 22, "claim 16," should read --claim 15,--.

UNITED STATES PATENT AND TRADEMARK OFFICE
CERTIFICATE OF CORRECTION

PATENT NO. : 5,761,555
DATED : June 2, 1998
INVENTOR(S) : MASAAKI ISHIHARA, ET AL It is certified that error appears in the above-identified patent and that said Letters Patent is hereby corrected as shown below:

COLUMN 14

Line 46, "means for contacting" should read --guide contact--.
Line 53, "wherein the magnetic head" should read --further comprising a magnetic head that--.
Line 54, "and" should read --where--;

Signed and Sealed this

Eighth Day of June, 1999

Attest:

Q. TODD DICKINSON

*Attesting Officer*   *Acting Commissioner of Patents and Trademarks*